(12) United States Patent
Madden et al.

(10) Patent No.: US 11,530,652 B2
(45) Date of Patent: Dec. 20, 2022

(54) WATER INJECTION (71) Applicant: ROLLS-ROYCE plc, London (GB)

(72) Inventors: Christopher P. Madden, Derby (GB); Peter Swann, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/189,663

(22) Filed: Mar. 2, 2021

(65) Prior Publication Data
US 2021/0277839 A1    Sep. 9, 2021

(30) Foreign Application Priority Data

Mar. 4, 2020 (GB) ........................................ 2003094
Mar. 4, 2020 (GB) ........................................ 2003095

(51) Int. Cl.
F02C 9/28 (2006.01)
F23R 3/34 (2006.01)
F02C 3/30 (2006.01)
F02C 9/26 (2006.01)

(52) U.S. Cl.
CPC .................. F02C 9/28 (2013.01); F02C 3/30 (2013.01); F23R 3/346 (2013.01); F02C 9/263 (2013.01); F05D 2270/08 (2013.01); F05D 2270/804 (2013.01)

(58) Field of Classification Search
CPC ... F02C 3/30; F05D 2270/804; F05D 2270/08
See application file for complete search history.

(56) References Cited

U.S. PATENT DOCUMENTS

| | | | |
|---|---|---|---|
| 7,971,438 B2 | 7/2011 | Taylor et al. | |
| 2002/0063479 A1* | 5/2002 | Mitchell | F02C 7/2365 |
| | | | 307/153 |
| 2003/0217553 A1 | 11/2003 | Gadde et al. | |
| 2003/0217554 A1 | 11/2003 | Gadde et al. | |

(Continued)

FOREIGN PATENT DOCUMENTS

| | | |
|---|---|---|
| EP | 2677138 A2 | 12/2013 |
| EP | 2860375 A1 | 4/2015 |

(Continued)

OTHER PUBLICATIONS

European search report dated Jul. 5, 2021, issued in EP patent application No. 20206447.
Great Britain search report dated Aug. 19, 2020, issued in GB Patent Application No. 2003094.6.
Great Britain search report dated May 22, 2020, issued in GB Patent Application No. 2003095.3.

(Continued)

*Primary Examiner* — Katheryn A Malatek (57) ABSTRACT

A gas turbine engine for an aircraft. The gas turbine comprises a combustor, a fuel injection system connected with a source of fuel and configured to inject fuel into the combustor, a water injection system connected with a source of water and which is configured to inject water into the combustor, and a control system. The control system is configured to identify an atmospheric condition; determine a water-fuel ratio for injection into the combustor of the gas turbine engine in response to the atmospheric condition; and control injection of fuel and water by the fuel injection system and the water injection system according to said water-fuel ratio to control an soot emissions caused by combustion of fuel therein.

18 Claims, 10 Drawing Sheets

(56) References Cited

U.S. PATENT DOCUMENTS

| | | | | |
|---|---|---|---|---|
| 2010/0043443 A1* | 2/2010 | Noppel | .................... | F02K 1/52 |
| | | | | 60/39.5 |
| 2010/0287943 A1 | 11/2010 | McMahan et al. | | |
| 2013/0031907 A1* | 2/2013 | Woerz | ...................... | F23R 3/28 |
| | | | | 239/398 |
| 2013/0206912 A1* | 8/2013 | Bright | .................... | B64D 1/18 |
| | | | | 62/601 |
| 2013/0343958 A1* | 12/2013 | Swann | .................... | F02C 9/28 |
| | | | | 422/111 |
| 2015/0100219 A1* | 4/2015 | Swann | .................... | F02C 7/22 |
| | | | | 701/100 |
| 2016/0273449 A1* | 9/2016 | DiCintio | ................ | F23D 11/16 |

FOREIGN PATENT DOCUMENTS

| | | |
|---|---|---|
| EP | 3301361 A1 | 4/2018 |
| GB | 2524775 B | 10/2015 |
| GB | 2534559 A | 8/2016 |

OTHER PUBLICATIONS

Karcher et al., The microphysical pathway to contrail formation, Aug. 13, 2015.
Karcher & Yu, Role of aircraft soot emissions in contrail formation, Jan. 7, 2009.
European search report dated Jul. 5, 2021, issued in EP Patent Application No. 21155908.
European search report dated Jun. 29, 2021, issued in EP Patent Application No. 21155907.

* cited by examiner

WATER INJECTION

CROSS REFERENCE TO RELATED APPLICATIONS

This application claims priority from United Kingdom Patent Application Numbers 2003094.6 and 2003095.3, both filed Mar. 4, 2020, the whole contents of which are incorporated herein by reference in their entirety.

BACKGROUND

Technical Field

This disclosure concerns aircraft gas turbine engines with water injection systems, and methods of operation thereof.

Description of the Related Art

Combustion of hydrocarbon fuels in aero engine combustion systems produces a hot exhaust stream composed primarily of nitrogen, oxygen, carbon dioxide and water vapour. In addition to these major components, a quantity of soot is also produced in locally-rich flame zones, along with thermal nitrogen oxides and sulphur oxides. Unburnt hydrocarbons and carbon monoxide may also be emitted in very low concentrations, together with trace quantities of other particulates.

The emission of a warm, moist exhaust plume into the cold ambient air found at typical flight levels can, under certain circumstances, result in the formation of condensation trails (also known as vapour trails or, as used hereinafter, by the contraction contrails). Application of the well-established Schmidt-Appleman criterion is indicative of whether a contrail can form, and in essence requires that the ambient temperature is below a threshold temperature. This threshold temperature is a function of ambient relative humidity over water and the gradient of a line representing the mixing process from the exhaust plume to ambient conditions in terms of water vapour partial pressure and temperature.

Microphysical analysis indicates that, for current fuel compositions and combustion technologies, the mechanisms of ice crystal formation depend principally upon emissions of soot. Initially-dry soot particles become activated by adsorption of oxidised sulphur, leading to scavenging of water molecules when relative humidity over water is in excess of 100 percent. Following this, immersion freezing occurs, producing an ice nucleus. Further depositional growth of the ice crystals may then proceed, in dependence upon the amount of water vapour, initially in the exhaust plume and subsequently in ambient air.

If ambient air is not supersaturated with respect to ice, then as the plume continues to mix out, ice mass is lost via sublimation and the contrail disappears. However, if ambient air is supersaturated with respect to ice, then the contrail may continue to exist for a substantial period of time and is termed a persistent contrail. These initially-linear contrails eventually spread out to form cirrus, and together are known as aviation-induced cloudiness.

The impact of aviation-induced cloudiness upon the planet's energy balance comprises two aspects. During the day, aviation-induced cloudiness reflects incoming sunlight back into space, leading to an advantageous climate cooling effect. During both day and night, aviation-induced cloudiness also intercepts outgoing infrared radiation, leading to unwanted warming. The net effect of contrails formed by current aviation patterns is one of warming. Control over the properties of contrails is therefore desirable to influence this net effect to reduce warming, and possibly even encourage cooling.

SUMMARY

The present disclosure is directed towards aircraft gas turbine engines with water injection systems, and methods of operation thereof.

One such gas turbine engine, which may be for an aircraft installation, comprises:
  a combustor;
  a fuel injection system connected with a source of fuel and configured to inject fuel into the combustor;
  a water injection system connected with a source of water and which is configured to inject water into the combustor;
  a control system configured to: identify an atmospheric condition; determine a water-fuel ratio for injection into the combustor of the gas turbine engine in response to the atmospheric condition; and control injection of fuel and water by the fuel injection system and the water injection system according to said water-fuel ratio to control an soot emissions caused by combustion of fuel therein.

One such method of operating a gas turbine method comprises:
  providing a source of fuel and a source of water;
  identifying an atmospheric condition;
  determining a water-fuel ratio for injection into a combustor of the gas turbine engine in response to the atmospheric condition;
  injecting water and fuel according to said water-fuel ratio into the combustor to control soot emissions caused by combustion of fuel therein.

DESCRIPTION OF THE DRAWINGS

Embodiments will now be described by way of example only with reference to the accompanying drawings, in which.

DETAILED DESCRIPTION

Figure 1:
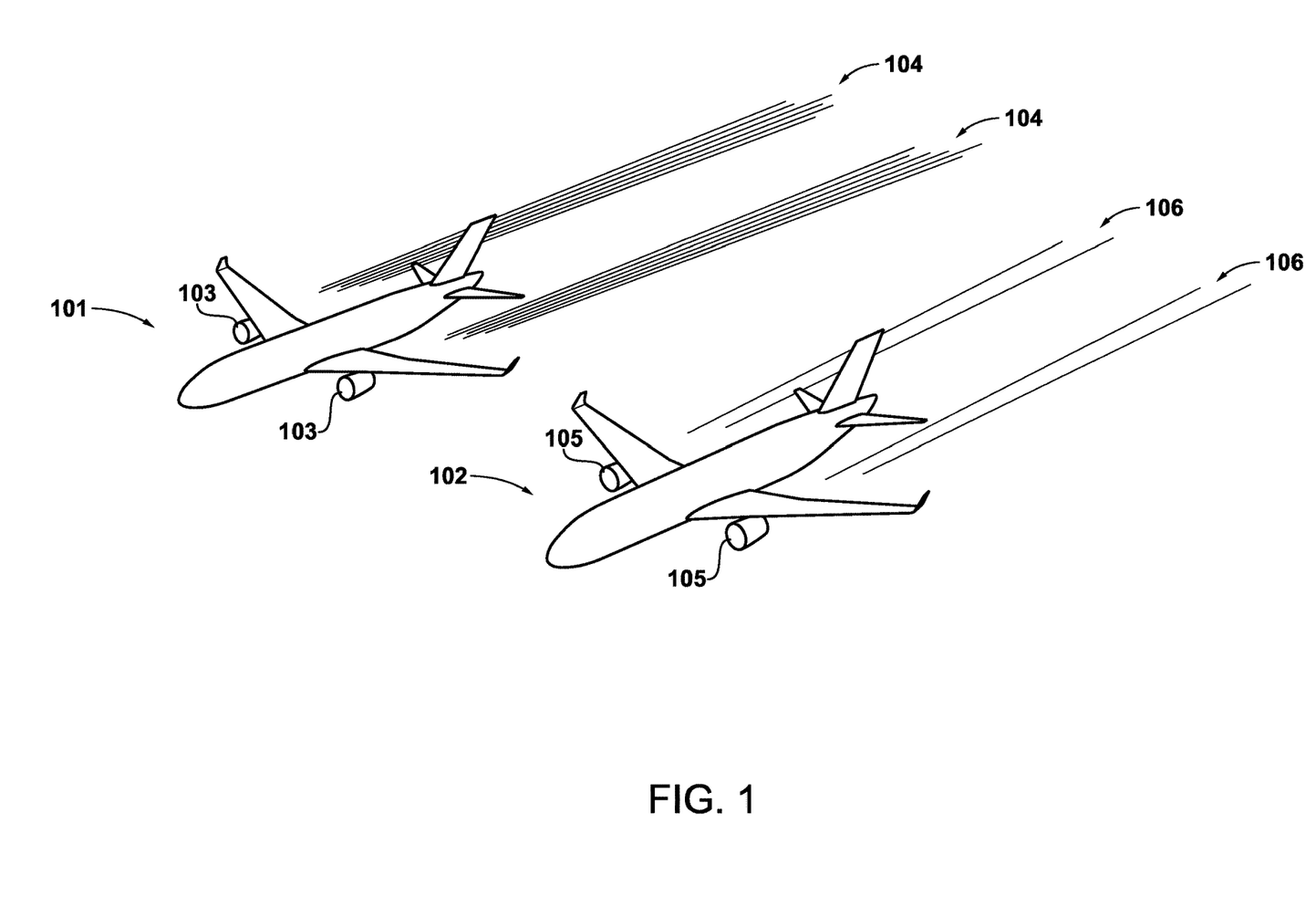
FIG. 1 shows two aircraft in flight, one of which has a pair of engines configured as set out above.

FIG. 1

Two aircraft 101 and 102 are illustrated in FIG. 1 in formation at substantially the same flight level and in substantially the same atmospheric conditions.

Aircraft 101 comprises two engines 103 which, due to their configuration and operating point, are forming contrails 104. Aircraft 102 comprises two engines 105 which are configured in accordance with the present disclosure, and are thus forming contrails 106 having a lower optical depth than contrails 104. As will be described herein, the engines 105 include functionality so as to allow the optical depth of any contrails they produce to be modified.

As used herein, optical depth is a measure of how much electromagnetic radiation, optionally in certain wavelength ranges, is prevented from travelling through a region. In the case of a contrail or ice cloud, optical depth is influenced primarily by the ice particle number density, effective ice particle radius, and the physical thickness of the cloud. Since most contrails are optically thin the magnitude of their radiative forcing is approximately proportional to their optical depth.

Thus, in the example of FIG. 1, a determination has been made to the effect that, in terms of climate impact, it would be preferable for any contrails produced to have a lower optical depth. In turn, therefore measures are taken within the engines 105 to reduce the optical depth of the contrails 106, so as to reduce the radiative forcing they cause.

As will also be described in further detail herein, the functionality of engines 105 is such that they may respond to the converse determination, i.e. that in terms of climate impact it would be preferable for any contrails produced to have a higher optical depth.

Figure 2:
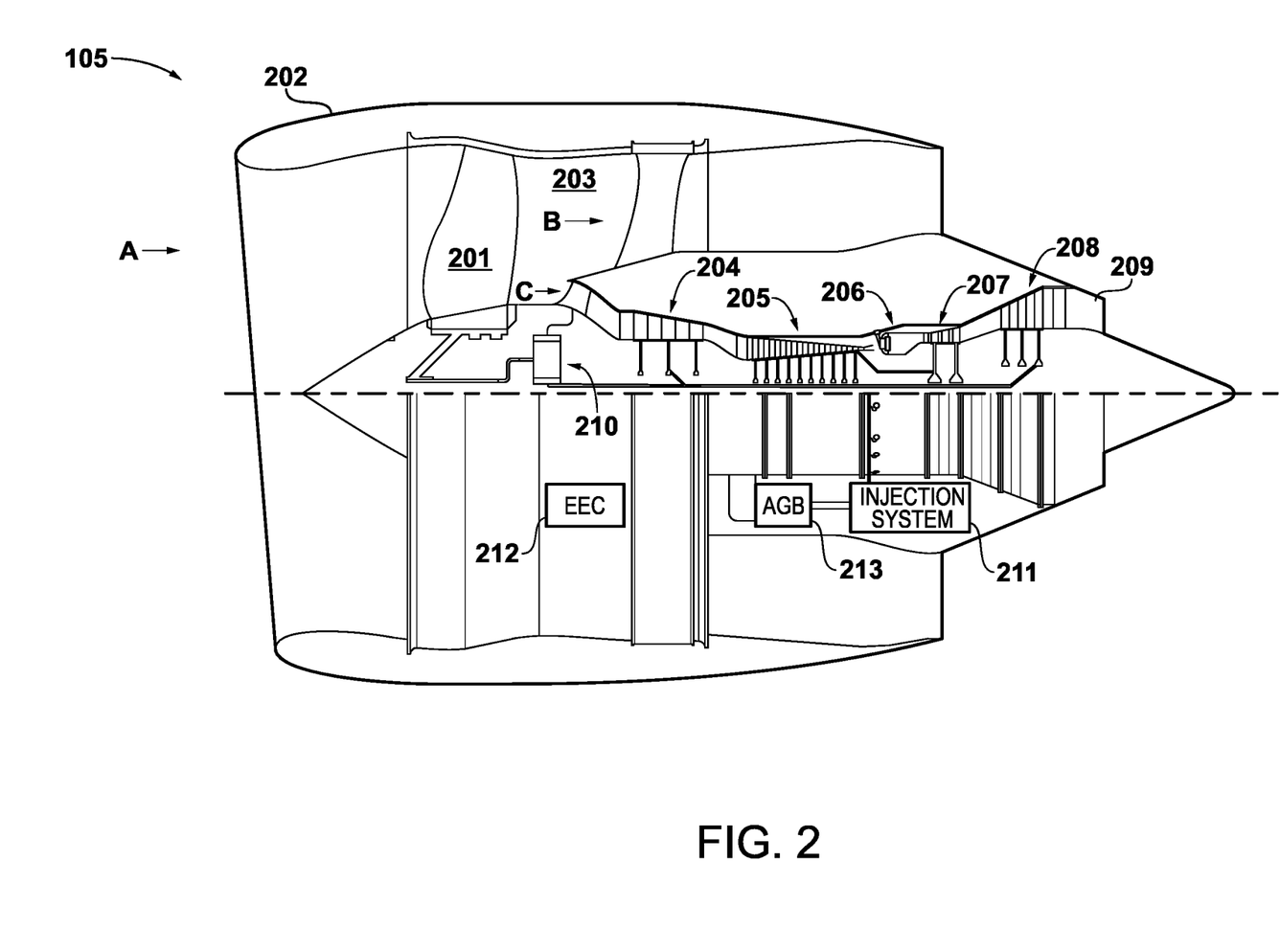
FIG. 2 shows a general arrangement of one of the engines of FIG. 1.

FIG. 2

A general arrangement of one of the engines 105 for aircraft 102 is shown in FIG. 2.

In the present embodiment, the engine 105 is a turbofan, and thus comprises a ducted fan 201 located in a nacelle 202. The fan 201 receives intake air A and generates two airflows: a bypass flow B which passes axially through a bypass duct 203 and a core flow C which enters a core gas turbine.

The core gas turbine comprises, in axial flow series, a low-pressure compressor 204, a high-pressure compressor 205, a combustor 206, a high-pressure turbine 207, and a low-pressure turbine 208.

In operation, the core flow C is compressed by the low-pressure compressor 204 and is then directed into the high-pressure compressor 205 where further compression takes place. The compressed air exhausted from the high-pressure compressor 205 is directed into the combustor 206 where it is mixed with fuel and the mixture is combusted.

Following combustion, the resultant hot combustion products are discharged and expand through, and thereby drive, the high-pressure turbine 207 and in turn the low-pressure turbine 208 before being exhausted via a core nozzle 209 to provide a small proportion of the overall thrust.

The fan 201 is driven by the low-pressure turbine 208 via a reduction gearbox 210. In the present embodiment, the reduction gearbox 210 takes the form of an epicyclic gearbox. In this specific embodiment, the reduction gearbox 210 is a planetary-type epicyclic gearbox and thus comprises a sun gear meshed with a plurality of planet gears located in a rotating carrier. In this example, five planet gears are provided. The planet gears are also meshed with a static ring gear. The rotating carrier is connected with the fan 201.

As described previously, in the present embodiment the engine 105 utilises water injection to control contrail optical depth. Thus, the engine 105 comprises a fluid injection system 211 which operates under the control of an electronic engine controller (EEC) 212. The electronic engine controller 212 is configured to command the injection of water and fuel in accordance with a particular water-fuel ratio (WFR).

In the present embodiment, the fluid injection system 211 comprises mechanically-driven water and fuel pumps connected with an accessory gearbox 213, itself driven via a high-pressure spool radial driveshaft of known configuration (not shown). In alternative configurations, for example in a more electric engine (MEE) configuration, the pumps may be electrically-driven.

Figure 3:
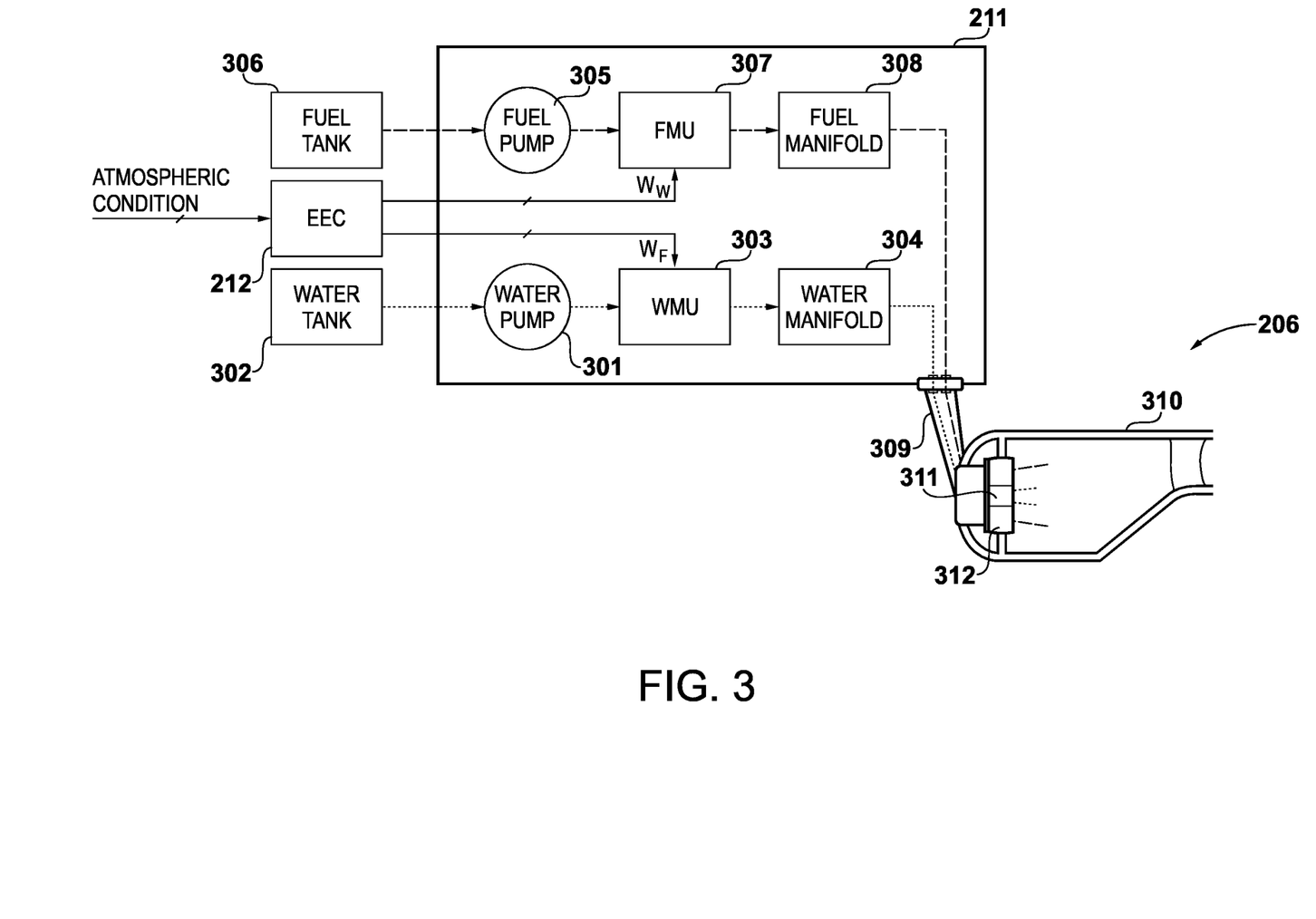
FIG. 3 shows the injection system of the engine of FIG. 2.

FIG. 3

A block diagram illustrating the fluid and control arrangement for the fluid injection system 211 is shown in FIG. 3. In the present example, the fluid injection system 211 can be conceptually divided into a water injection system and a fuel injection system.

In the present example, the water injection system comprises a water pump 301 arranged to draw water from a water tank 302. In the present example, the water tank 302 (which could also comprise a plurality of tanks) is mounted in the fuselage of the aircraft 102, but could be located in any other suitable location, for example in the wings of the aircraft 102. Water may be pre-loaded into the water tank 302 before flight. Additionally or alternatively, water may be sourced from zonal dryers in the aircraft or collected from a hydrogen-powered auxiliary power unit (APU), such as a hydrogen-burning gas turbine APU or a fuel-cell based APU. It is also contemplated that the water could be condensed from the engine exhaust, possibly using an arrangement similar to that set out in U.S. Pat. No. 7,971,438 which is assigned to the present applicant and incorporated herein by reference.

The water injection system further comprises a water metering unit 303 configured to receive water from the water pump 301. The water metering unit 303 controls the amount of water delivered into a water manifold 304.

The fuel injection system comprises a fuel pump 305 arranged to draw fuel from a fuel tank 306 of the aircraft 102. As will be appreciated, in practice there may be several physical fuel tanks distributed throughout the aircraft 105, for example in the wings and/or in the fuselage. The fuel injection system further comprises a fuel metering unit 307 configured to receive fuel from the fuel pump 305. The fuel metering unit 307 controls the amount of fuel delivered into a fuel manifold 308.

In the present embodiment, the combustor 206 comprises a plurality of nozzles 309 which are configured as duplex injectors configured for injection of water and fuel. In the present embodiment, 16 circumferentially-spaced nozzles 309 are disposed around an annular combustor can 310. As will be appreciated, more or indeed fewer nozzles may be provided depending upon the physical engine size and design requirements. Further, different combustor configurations may be used, for example cannular, canned, etc.

Water from the water manifold 304 and fuel from the fuel manifold 308 are delivered to each nozzle 309 for co-injection of water and fuel directly into the combustor can 310. In the present embodiment, the nozzles 309 comprise a central water injector 311 and a concentric fuel injector 312. In this configuration, the water injector 311 is positioned such that the water is injected just upstream of, and therefore directly into, the primary combustion zone in the combustor can 310. Those skilled in the art will be familiar with the operation of such water injection systems.

It is contemplated that the principles of the present disclosure may be applied to other water injection configurations, for example those with separate water and fuel injectors (as opposed to duplex), which may be arranged in parallel (radially separate, axially aligned). In such a configuration, the water injectors would again be positioned such that they inject water just upstream of the primary combustion zone.

In other implementations, the injectors could be arranged in series (axially separate, with optional radial alignment), with water being injected further upstream than the fuel. The water injectors 311 in such a series arrangement may be disposed between the exit of the high-pressure compressor 205 and the fuel injectors 312. Alternatively, the water injectors 311 could be placed even further upstream, such as in the duct between the low-pressure compressor 204 and the high-pressure compressor 205. Such an arrangement may provide for a degree of intercooling of the overall core gas turbine cycle, due to evaporation of the injected water.

The balance of injection by the water injectors 311 and the fuel injectors 312 is controlled by the electronic engine controller 212. In the present embodiment, the electronic engine controller 212 is configured to provide a control signal to the water metering unit 303 indicative of the water flow rate ($W_W$) and a control signal to the fuel metering unit 307 indicative of the fuel flow rate ($W_F$). In this way, water and fuel are injected according to a water-fuel ratio which is the quotient of these two flow rates, i.e. $WFR=W_W/W_F$.

In the present embodiment, the electronic engine controller 212 is configured to determine the water-fuel ratio in dependence upon atmospheric conditions. In an embodiment, the said atmospheric conditions are those causative of contrails.

Figure 4:
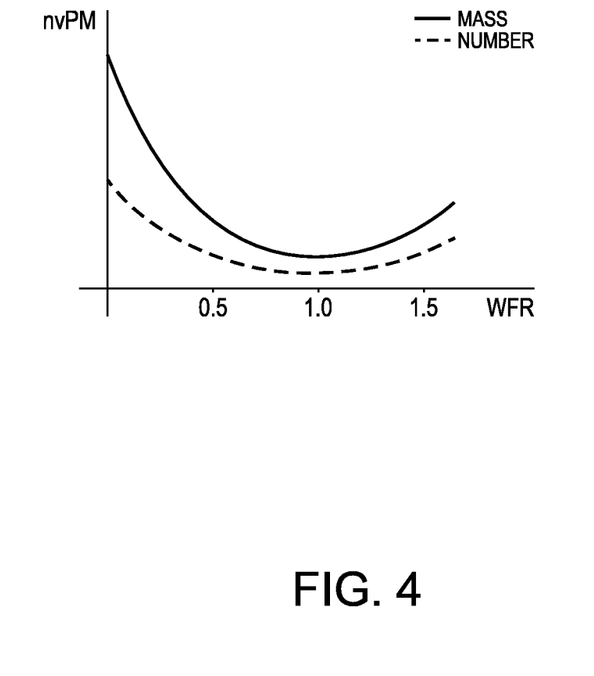
FIG. 4 is a chart showing the relationship between water-fuel ratio and two non-volatile particulate matter parameters, mass and number.

FIG. 4

FIG. 4 is a chart showing the relationship between water-fuel ratio and the non-volatile particulate matter (nvPM) number and mass parameters. The various non-volatile particulate matter parameters are defined by the International Civil Aviation Organization. The dominant constituent of non-volatile particulate matter is soot, and so, in the present embodiments, non-volatile particulate matter number is used as the measure of soot emissions, since the quantity of soot particles emitted per unit distance travelled by an aircraft has a substantial impact on contrail optical depth.

As can be seen in the chart, both the nvPM mass and nvPM number parameters decrease as the water-fuel ratio increases, until a stationary point is reached whereupon the trend reverses. The reduction in non-volatile particulate matter from zero water-fuel ratio to the stationary point is caused by the increase in hydrogen and hydroxyl in the fuel-rich pockets of the flame. These species tend to inhibit the formation of soot precursors, in particular polycyclic aromatic hydrocarbons (PAHs), which otherwise form in high-temperature and oxygen-poor regions of the flame. As the water-fuel ratio increases past the stationary point, the reduction in temperature caused by the latent heat of evaporation of the injected water leads to reduced soot consumption downstream of the primary zone, and hence an increase in nvPM mass and nvPM number.

In the present example, the minimum nvPM mass and nvPM numbers are found at a water-fuel ratio of unity, i.e. equal water flow rate and fuel flow rate. It will be appreciated that the precise water-fuel ratio at which this minimum point is found may differ depending on the specific engine in which the principles of the present disclosure are applied.

The inventors have determined that this characteristic relationship exhibited in water injection systems of the type contemplated herein may be utilised to vary the non-volatile particulate matter mass and number.

In the present embodiment, the water-fuel ratio is selected based on a target nvPM number. In a specific embodiment, water-fuel ratios between zero (i.e. no water injection, known as "dry") and the stationary point of the relationship of FIG. 4 are utilised. Thus, progressively greater water-fuel ratios up to this limit reduce the nvPM number compared to dry operation.

In an alternative embodiment, use of larger water-fuel ratios may be contemplated should there be a desire to achieve a greater nvPM number than can be achieved with dry operation—as water-fuel ratios continue to climb the nvPM number tends to increase. Such a requirement could exist based on the processing which will be described with reference to FIGS. 8, 9 and 10.

It is contemplated that in terms of hard limits, in an example the water-fuel ratio may be varied over the range from zero (dry operation) to 2 (a water flow rate twice that of the fuel). This maintains satisfactory compressor surge margin and prevents high-pressure spool overspeed.

In an example, when water injection is active (i.e. wet operation), the water-fuel ratio may be from 0.5 to 2. In a more specific example, it may be from 0.8:1 to 1.2:1.

Figure 5A:
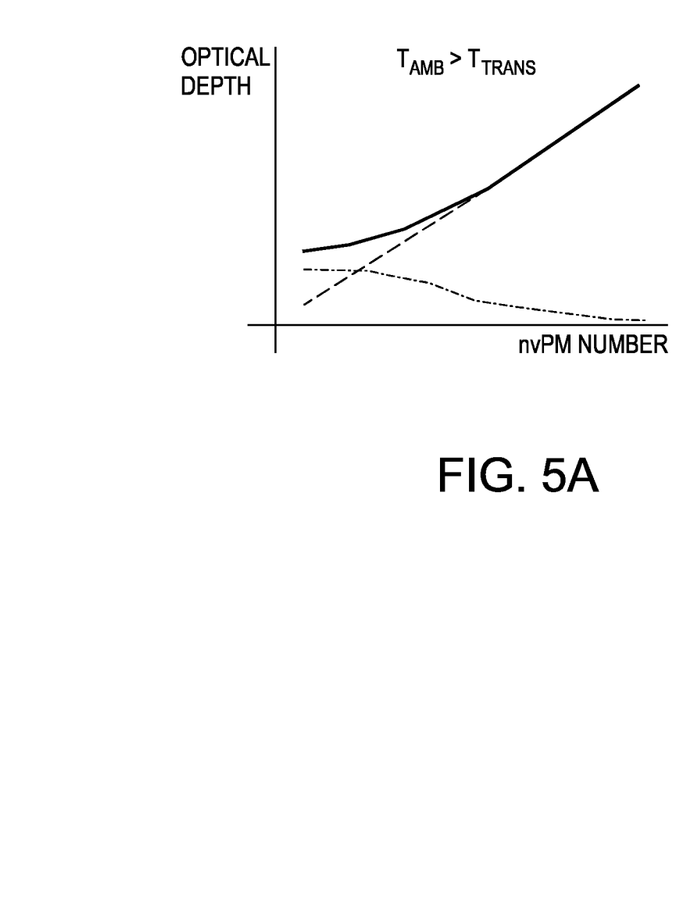
FIGS. 5A and 5B are charts showing the relationship between non-volatile particulate matter number and contrail optical depth at different ambient temperatures.
Figure 5B:
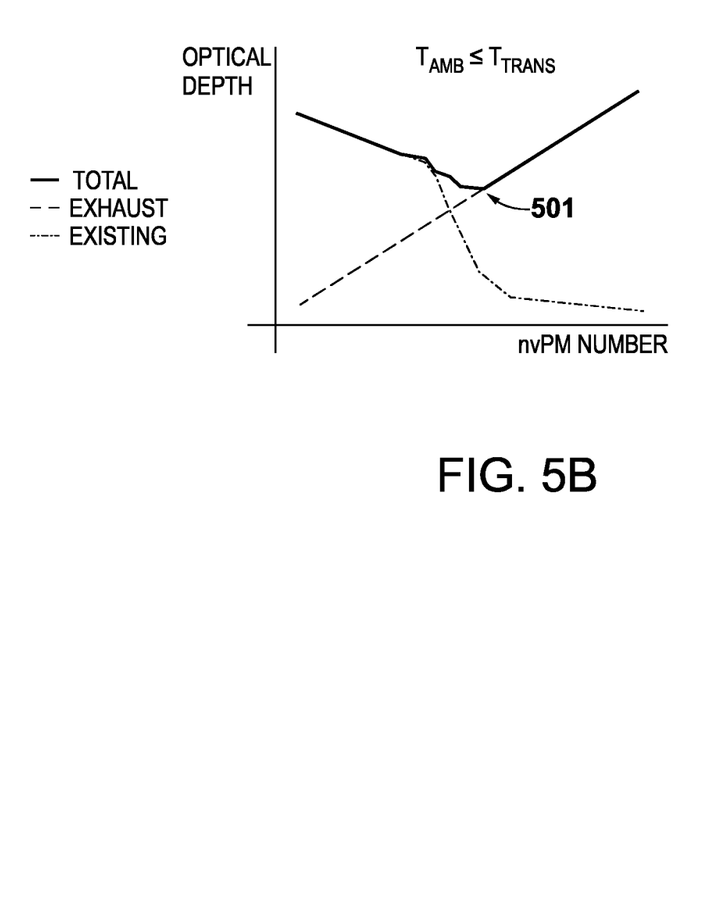

FIGS. 5A & 5B

FIGS. 5A and 5B are charts adapted from B. Karcher and F. Yu, "Role of aircraft soot emissions in contrail formation", *Geophysical Research Letters*, vol. 36, no. 1, 2009, which is incorporated herein by reference. The charts show the dependence of contrail optical depth on nvPM number at a fixed ambient relative humidity over water. The contributing factors to the contrails' optical depth (solid) are ice particles formed from deposition on exhaust soot (dashed), and ice particles formed from emitted and/or existing ambient liquid particles (dot-dashed). FIG. 5A shows the relationship for ambient temperatures above some transition temperature ($T_{AMB}>T_{TRANS}$), and FIG. 5B shows the relationship for ambient temperatures at or below the transition temperature ($T_{AMB} \leq T_{TRANS}$)

As shown in FIG. 5A, with ambient temperatures greater than the transition temperature, and at higher nvPM numbers, exhausted non-volatile particulate matter is largely determinative of the contrail's optical depth. At lower nvPM numbers, emitted and/or existing ambient liquid particles which freeze in the exhaust plume begin to dominate the contribution to overall optical depth. As can be seen, above the transition temperature, the relationship between nvPM number and optical depth is one which is monotonically increasing.

Referring to FIG. 5B, for ambient temperatures at or below the transition temperature, and at low nvPM numbers, a much greater number of emitted and/or existing ambient liquid particles freeze and hence there is an increase in contrail optical depth. It will be seen that the relationship between nvPM number and optical depth is no longer monotonic. Thus there exists a stationary point at a transition value 501.

In the research undertaken by Karcher and Yu referenced above, modelling suggested that there is a transition from the monotonically-increasing relationship of FIG. 5A to the non-monotonicity of FIG. 5B. As defined herein, the transition temperature $T_{TRANS}$ is, when considering a decreasing temperature, the temperature at which the relationship ceases to be monotonically increasing, with a stationary point appearing at the transition value 501.

The transition temperature for any particular ambient relative humidity over water may be determined in accordance with the modelling approach set out in B. Karcher, U. Burkhardt, A. Bier, L. Bock and I. Ford, "The microphysical pathway to contrail formation", *Journal of Geophysical Research: Atmospheres*, vol. 120, no. 15, pp. 7893-7927, 2015, which is incorporated herein by reference.

As described with reference to FIG. 4, control of water-fuel ratio may be used to effect changes in nvPM number. This characteristic, in conjunction with the relationships between nvPM number and optical depth described with reference to FIGS. 5A and 5B, allows the electronic engine controller 212 to effect changes in optical depth. Counter-intuitively, a reduction in optical depth can be achieved despite the inevitable increase in water vapour in the exhaust plume due to the injection of water.

Hence, in an embodiment, the determination of the water-fuel ratio for injection comprises identifying a condition to the effect that an optical depth of a condensation trail produced by the engine should be reduced or increased. In response to identifying that it should be reduced, a water-fuel ratio is evaluated that varies soot production to reduce ice particle formation. In response to identifying that the optical depth should be increased, a water-fuel ratio is evaluated that varies soot production to increase ice particle formation.

Figure 6:
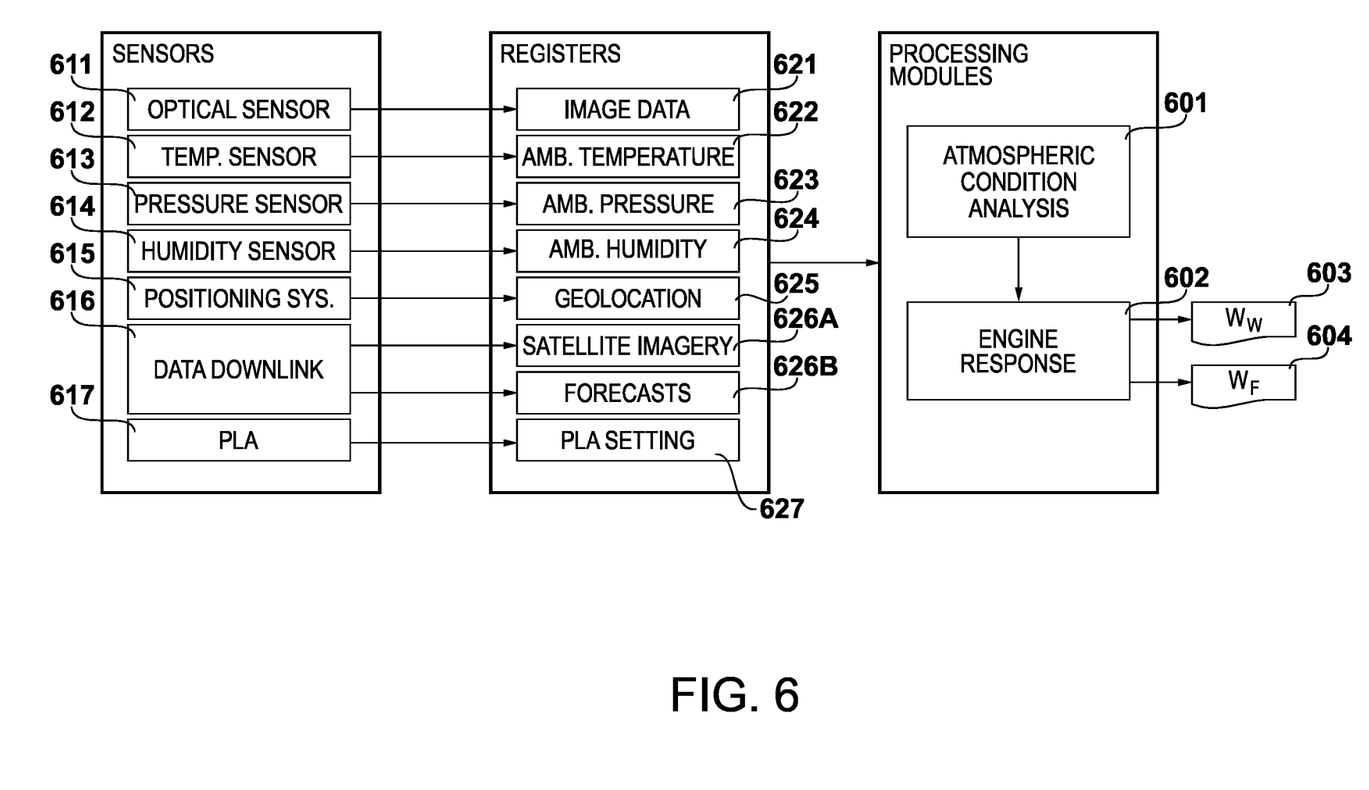
FIG. 6 shows sensor inputs, memory registers and processing modules in the electronic engine controller of the engine of FIG. 2.

FIG. 6

A block diagram is shown in FIG. 6 which illustrates sensor inputs, memory registers and processing modules in the electronic engine controller 212 to command a particular water-fuel ratio in dependence upon atmospheric conditions.

In terms of processing functionality, in the present embodiment the electronic engine controller 212 comprises an atmospheric condition analysis module 601 and an engine response module 602. The atmospheric condition analysis module 601 will be described in further detail with reference to FIG. 7. The engine response module 602 will be described in further detail with reference to FIGS. 8 to 10.

The modules 601 and 602 operate together to form an appropriate contrail optical depth response to an atmospheric condition in the form of a water-fuel ratio for implementation by the water metering unit 303 and the fuel metering unit 307. As described previously, in the present example, the engine response module 602 in the electronic engine controller 212 supplies a water flow rate ($W_W$) 603 to the water metering unit 303, and a fuel flow rate ($W_F$) 604 to the fuel metering unit 307.

It will be appreciated that whilst in the present embodiment the modules 601 and 602 are described as software running on the electronic engine controller 212, they may be implemented as software running on separate control units or even implemented in dedicated hardware. It will also be appreciated that some or all of the processing steps described herein for the modules 601 and 602 could be carried out at a location which is physically remote from the aircraft, making use of suitable datalinks to transmit data from the aircraft to the processing location and vice versa.

In the present embodiment, each module 601 and 602 is configured such that it has access to a plurality of registers storing various sensor outputs and/or downloaded data.

An optical sensor 611 is configured to produce image data 621 of the exhaust plume region of the engine 105. This facilitates analysis of the optical depth of a contrail being generated by the engine 105 during flight, and thus closed loop control of optical depth. Additionally or alternatively, other types of sensors such as lidar or radar may be used to generate data suitable for analysis of the contrail optical depth.

Various ambient condition sensors may be provided to facilitate assessment of atmospheric conditions. In the present embodiment, a temperature sensor 612 (for example, an outside air temperature probe or similar), a pressure sensor 613 (for example, an aneroid barometer forming part of a pitot-static arrangement or similar), and a humidity sensor 614 (for example, a hygrometer or similar) write to respective registers for ambient temperature 622, ambient pressure 623 (from which altitude may be derived), and ambient humidity 624.

A positioning system 615 (for example Global Positioning System, Galileo, etc.) provides geolocation data 625. A data downlink 616 (for example satellite communication or equivalent) facilitates acquisition of satellite imagery 626A and weather forecasts 626B to allow identification of regions conducive to contrail formation and/or contrail persistence.

The output of a power level angle sensor 617 in the cockpit of the aircraft 102 is stored in a corresponding register 627. This enables the electronic engine controller 212 to control various engine parameters to meet the power demanded by the pilot of the aircraft 102. The design of such control loops will be familiar to those skilled in the art.

It will be appreciated that in alternative embodiments only a subset of the sensors and registers may be selected for implementation. For example, optical sensors may be deployed and be the sole means of detection of contrail formation. Conversely, only temperature, pressure and humidity instruments may be selected for use in detection of conditions which indicate that contrails will form, and so on.

Figure 7:
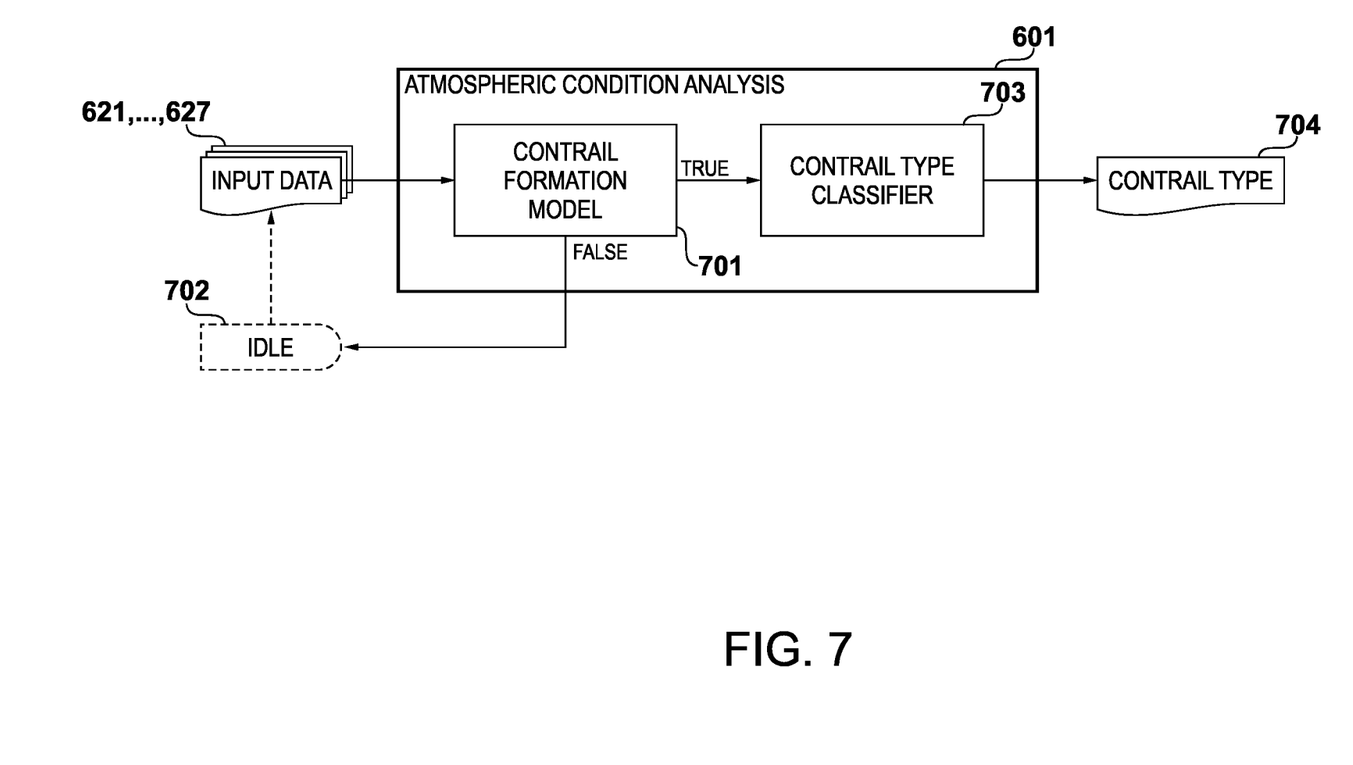
FIG. 7 shows an atmospheric condition analysis module of the processing modules of FIG. 6.

FIG. 7

The atmospheric condition analysis module 601 is shown in detail in FIG. 7.

Input data obtained from some or all of the registers 621-627 is obtained by a contrail formation model 701. The contrail formation model 701 is configured to determine whether or not contrail formation is likely under current ambient conditions and engine operating point, irrespective of subsequent persistence.

In an embodiment, the contrail formation model 701 uses the real- or near real-time atmospheric condition data measured by the sensors. For example, the measurement of ambient humidity 624 by the humidity sensor 614 may be used, or the image data 621 produced by the optical sensor 611.

In a specific embodiment, the Schmidt-Appleman criterion is applied and coupled with an assumption of a linear or approximately linear mixing trajectory in the space defined by temperature and water-vapour partial pressure. To perform this processing, the contrail formation model 701 utilises the measurements of ambient temperature 622, ambient pressure 623, and ambient humidity 624.

In an alternative embodiment, the contrail formation model 701 utilises the satellite imagery 626A and/or the weather forecasts 626B to determine whether atmospheric conditions are such that contrails will form. In a specific embodiment, the satellite imagery 626A is used in conjunction with the geolocation data 625 and an altitude reading derived from the ambient pressure 623 to confirm whether or not other aircraft in the vicinity have caused contrails or not. In a specific embodiment, the weather forecasts 626B are coupled to the Schmidt-Appleman criterion approach described above.

In the present embodiment, if the contrail formation model 701 determines that no contrail will form given current atmospheric conditions, then no action is taken and the atmospheric condition analysis module 601 proceeds to an idle process 702 where it waits until new input data are available.

If the contrail formation model 701 determines that a contrail will form, then control proceeds to a contrail type classifier 703 which is configured to determine, given ambient conditions, whether the contrail will persist or not. This may be achieved by assessing the ambient relative humidity with respect to ice: if the ambient air is supersaturated with respect to ice, then the contrail will persist. The output of the contrail type classifier 703 is the determined contrail type 704, and is provided to the engine response module 602.

Figure 8:
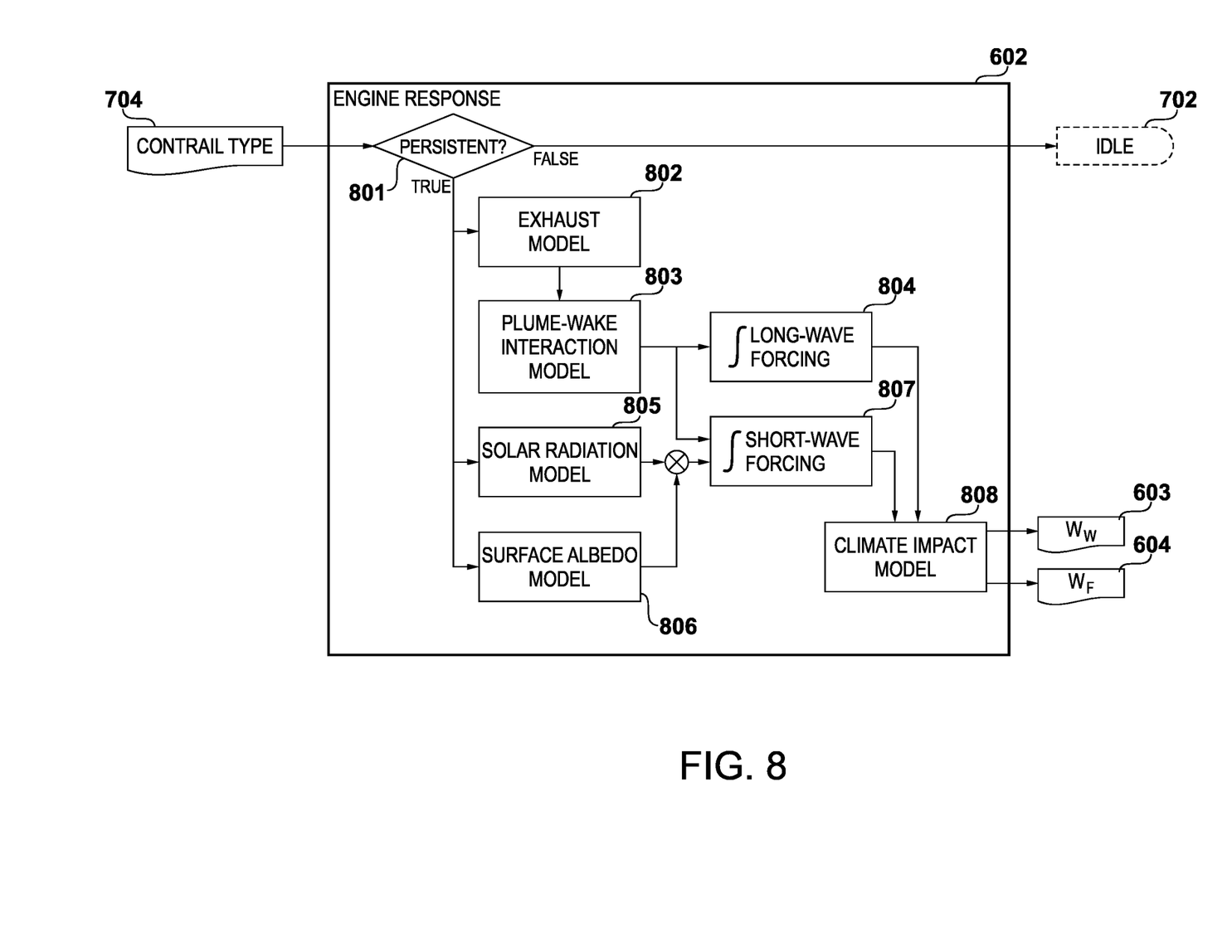
FIG. 8 shows an engine response module of the processing modules of FIG. 6.

FIG. 8

The engine response module 602 receives the determined contrail type 704 from the atmospheric condition analysis module 601, and proceeds to ask a question at a decision block 801 as to whether the contrail will be persistent, or not.

If this question is answered in the affirmative, then several models are invoked to assess the optimal response in terms of adjustments to the optical depth of the contrail.

An exhaust model 802 is executed which generates a set of exhaust composition data for a plurality of different water-fuel ratios using data pertaining to the current engine operating point and ambient conditions. During operation, the exhaust model 802 evaluates water flow rate and fuel flow rate pairs for each water-fuel ratio, and thus each exhaust composition has an associated pair of water and fuel flow rates. The exhaust model 802 will be described in further detail with reference to FIG. 9.

The set of exhaust composition data is then provided to a plume-wake interaction model 803 which assesses the effect of the wake of the aircraft 102 on the exhaust plume of the engine 105 for each exhaust composition. This model will be described in further detail with reference to FIG. 10. In the present embodiment, the model 803 outputs a set of predictions of the time-varying properties of a plurality of contrails, each caused by a corresponding member of the set of exhaust composition data from the exhaust model 802.

The output of model 803 is provided to a long-wave forcing model 804, which is configured to determine the time-integrated radiative forcing per unit length of each contrail due to long-wave (i.e. warming) effects over their expected lifetimes. In addition to models 802 and 803, a solar radiation model 805 and a surface albedo model 806 are executed and their outputs combined. The solar radiation model 805 is configured to determine the strength and orientation of incoming sunlight over the expected lifetime of the contrail in the post-vortex regime. The surface albedo model 806 is configured to determine the albedo of surfaces (including other clouds) which would receive incoming sunlight in the absence of a contrail formed by the aircraft. In the present embodiment, models 805 and 806 utilise the satellite imagery 626A and weather forecast data 626B to perform this assessment.

The combined output of models 805 and 806 are supplied, along with the output of model 803, to a short-wave forcing model 807 which is configured to determine the time-integrated radiative forcing due to short-wave (i.e. cooling) effects over the expected lifetime of the predicted set of contrails generated by the model 803.

The outputs of the long-wave forcing model 804 and the short-wave forcing model 807 are supplied to a climate impact model 808 which determines which contrail possesses the optimal optical depth for achieving the best balance between the magnitudes of the modelled short-wave cooling and long-wave warming effects.

In this way, the model 808 determines which exhaust composition will produce the most favourable contrail on the basis of a time-integrated effect of said contrail over its lifespan given a current atmospheric condition and a predicted future atmospheric condition.

The output of model 808 is the water flow rate 603 and fuel flow rate 604 which correspond to the most favourable contrail. In the present embodiment, the climate impact model 808 is configured to consider short-wave cooling to be a desirable effect, and long-wave warming to be an undesirable effect, and thus tends to favour contrails with an optical depth which reduces the net warming impact of the contrail.

It will be appreciated that water injection of the type contemplated herein preferably uses demineralised water to avoid corrosion, fouling, etc. As such it is typically desirable to minimise the amount of such water carried to reduce one or more of the cost of its procurement, the cost of its carriage in terms of increased fuel consumption, and decreased payload. Thus, in an embodiment, the climate impact model 808 is further configured to only initiate wet operation once a threshold level of climate benefit is exceeded. This may allow a reduction in the amount of water which needs to be loaded for the mission.

In a specific embodiment, a subroutine is provided in the climate impact model 808 which is configured to evaluate the impact of using the water at that moment, versus during the remainder of the mission. Such an evaluation may for example include the climate impact of the additional fuel consumption associated with continuing to carry the water if it is not used. The design of such cost functions to optimise resource usage will be familiar to those skilled in the art.

Further, it is contemplated that a degree of processing could be performed prior to the beginning of a mission by the operator of the aircraft 102 to optimise the water loading, taking into account cost of demineralisation, cost of fuel and/or reduction in payload associated with carriage of the demineralised water, predicted climate impact based on weather forecasts, etc.

In the present example, if the question asked at decision block 801 is answered in the negative, then the idle process 702 is invoked until new input data are available. In alternative embodiments, measures may still be taken to alter the optical depth, possibly adopting a similar approach to that for persistent contrails.

Figure 9:
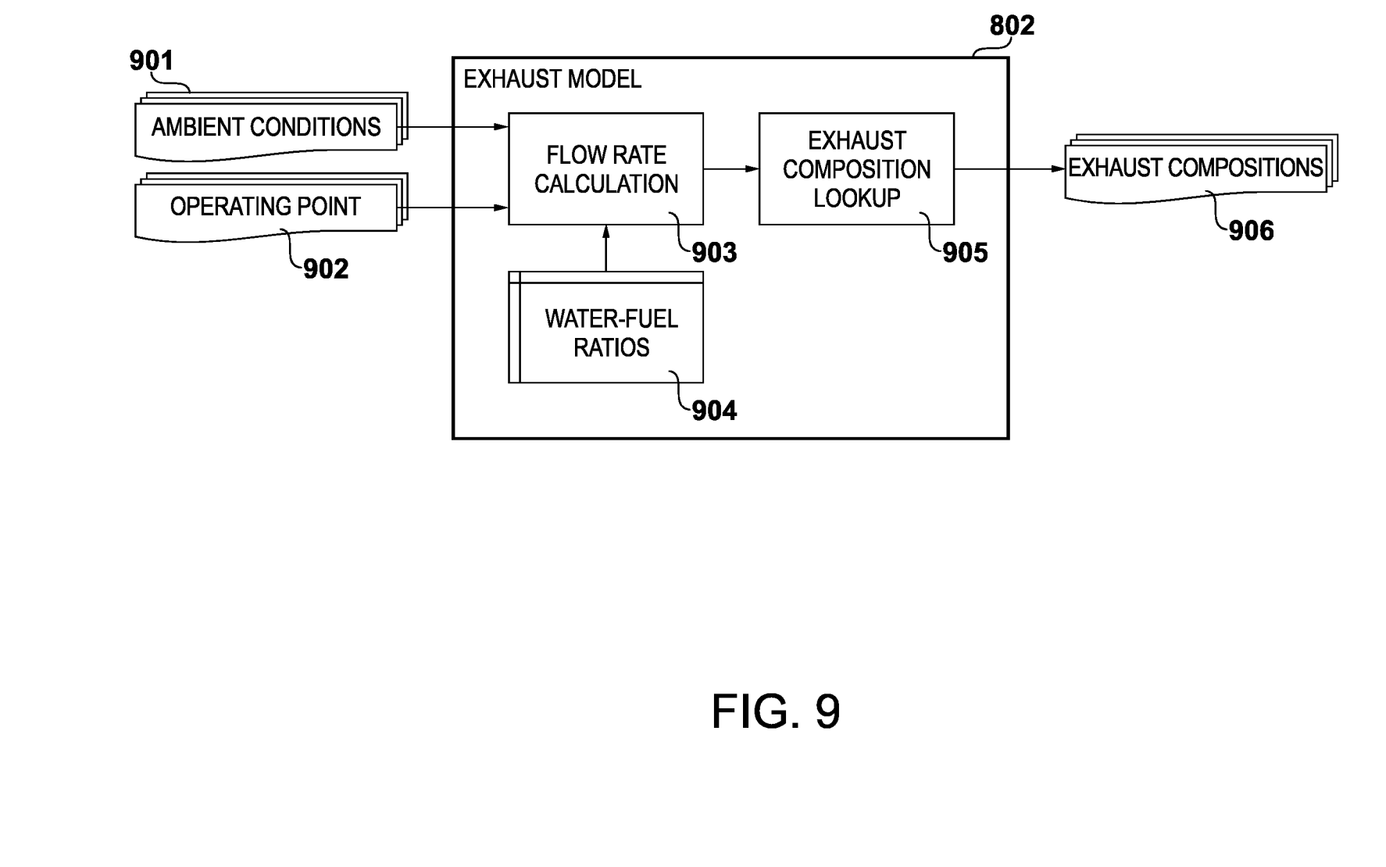
FIG. 9 shows an exhaust model of the engine control module of FIG. 7.

FIG. 9

The exhaust model 802 is shown in more detail in FIG. 9.

First, the model 802 obtains an ambient condition dataset 901 corresponding to the current location of the aircraft 102 (including for example ambient temperature 622, ambient pressure 623, ambient humidity 624, etc.) and an operating point dataset 902 comprising various operational parameters of the engine 105 (e.g. power lever angle setting 627, flight Mach number, temperatures and pressures at various stations, spool rotational speeds, etc.).

The model 802 first runs a flow rate calculation process 903. This process is configured to evaluate a plurality of water flow rate and fuel flow rate pairs corresponding to a plurality of water-fuel ratios 904, which, in the present embodiment, are pre-defined and stored in a table. The pairs of water and fuel flow rates are evaluated subject to the constraint of a fixed engine thrust value corresponding to the current power lever angle setting 627. This approach is adopted to compensate for the tendency for thrust to increase with wet operation due to an increase in mass flow through the turbines 207 and 208. Wet operation also tends to require greater fuel flow rates to compensate for the latent heat of evaporation of the injected water.

In the present embodiment, the flow rate calculation process 903 is configured to produce a single water flow rate and fuel flow rate pair for each water-fuel ratio. In a specific embodiment, the flow rate calculation process 903 is configured to minimise the water flow rate.

The water flow rate and fuel flow rate pairs are then supplied to an exhaust composition lookup process 905. A lookup table is used in this example to improve speed of execution of the exhaust model 802. The exhaust composition lookup process 905 receives the water flow rate and fuel flow rate pairs along with ambient condition dataset 901 and the operating point dataset 902, and proceeds to use these as a key to find a corresponding value of exhaust composition data. These exhaust composition data may be produced during engine testing prior to certification. In the present example, the exhaust composition data comprises exhaust temperature, nvPM number, water vapour content in the exhaust, concentrations of other chemical species, etc. It is contemplated that further dimensions may be included for the lookup table, for example precise fuel composition to compensate for different water emissions indexes, different aromatic contents (and thus tendencies to form soot), and so on.

In an alternative embodiment, the exhaust composition lookup process 905 could be replaced by a surrogate model configured to model the combustion process in real time.

Figure 10:
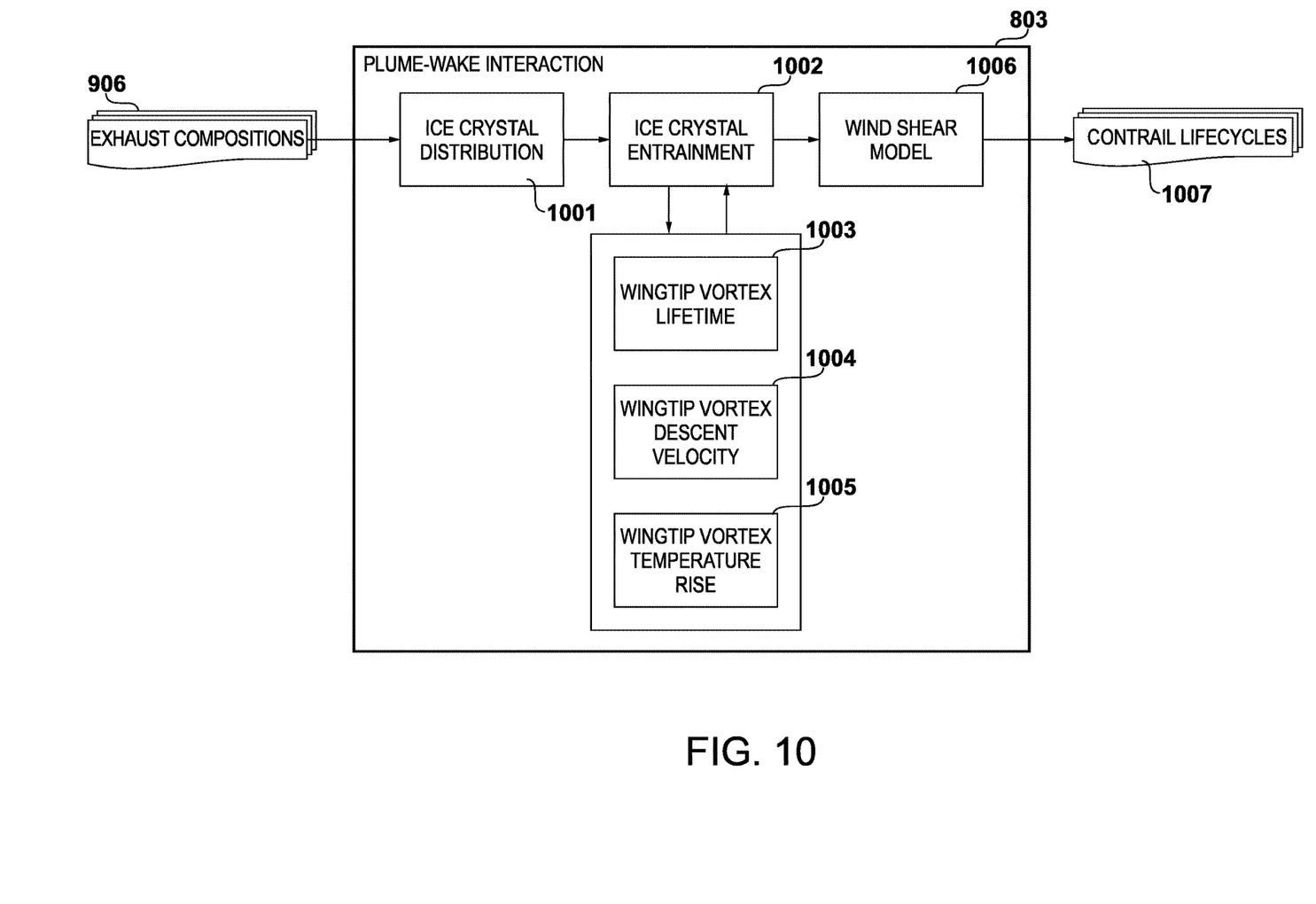
FIG. 10 shows a plume-wake interaction model of the engine control module of FIG. 7.

Iteration of the exhaust composition lookup process 905 over all the water flow rate and fuel flow rate pairs results in the production of a set of exhaust compositions 906 indexed by water-fuel ratio for supply to the plume-wake interaction model 803.

FIG. 10

The plume-wake interaction model 803 is shown in more detail in FIG. 10.

Input data in the form of the exhaust compositions 906 are supplied to an ice crystal distribution model 1001, which is configured to determine, for each of the plurality of possible exhaust compositions, the initial particle size distribution of ice particles formed in the exhaust plume of the engine 105. In the present embodiment, this is performed using the modelling approach set out in Karcher, Burkhardt, Bier, Bock and Ford referenced above, which uses exhaust composition data, such as the nvPM number and water vapour mass, along with ambient temperature 622, ambient pressure 623, and ambient humidity 624. In this way, the ice crystal distribution model 1001 is operable to model the effect of various water-fuel ratios on contrail production.

It should be appreciated that this modelling may reveal water-fuel ratios for which the attendant increase in emitted water vapour can result in a greater proportion of emitted soot particles being activated. Thus, even if fewer soot particles are produced due to water injection, there may be an increase in optical depth compared to dry operation. This tends to occur in temperature regimes only slightly below the contrail critical temperature. It will therefore be appreciated that the ice crystal distributions for the exhaust compositions 906 may include examples with lower or greater optical depth than for dry operation, even if hard limits in terms of water-fuel ratios are imposed. In the present embodiment, the climate impact model 808 will determine the most favourable exhaust composition and hence water-fuel ratio in accordance with its climate objective.

Referring again to the Figure, the ice crystal distributions are supplied to an ice crystal entrainment model 1002, which is configured to determine the extent to which particles in the engine exhaust become captured by wingtip vortices of the aircraft 102.

This is modelled because a significant proportion of ice crystals which would otherwise form a persistent contrail may be destroyed by heating in the vortices, thereby reducing the optical depth of the contrail.

The ice crystal entrainment model 1002 is configured to determine the particle size distribution of ice particles initially captured within the wingtip vortex core, given an initial particle size distribution of a newly formed contrail, in dependence upon the location of the corresponding engine relative to the wingtip. It is further configured to determine the number or ratio of ice particles which remain after the adiabatic heating experienced within the wingtip vortex core during the lifetime of the wingtip vortex. The remaining ice particles also include those ice particles which were detrained from the vortex prior to its breakup.

In order to model this effect, the ice crystal entrainment model 1002 calls upon one or more other models. In this example, a wingtip vortex lifetime model 1003 is configured to determine the lifetime of a wingtip vortex in dependence upon such factors as the strength of ambient turbulence, the rate of change of ambient temperature with altitude, and/or the instantaneous aircraft weight (e.g. taking account of the amount of fuel burned so far during the flight). A wingtip vortex descent velocity model 1004 is configured to determine the downward velocity of a wingtip vortex, in dependence upon factors including the instantaneous aircraft weight, and aircraft configuration. A wingtip vortex temperature rise model 1005 is configured to determine the temperature change likely to be experienced within the vortex core as a result of the determined change in altitude during its descent and/or the speed of its descent.

It is contemplated that further models could be provided, for example a model from which can be determined the proportion, of those ice particles not captured/retained by the wingtip vortex core, which experience sufficient adiabatic heating in the region of downwash between the aircraft's wingtip vortices so as to be eliminated.

The output of ice crystal entrainment model 1002 is then supplied to a wind shear model 1006 which predicts the degree of horizontal spreading of the contrail over its expected lifetime. This prediction is performed using the vertical extent of the post-vortex contrail, and current and future weather conditions obtained from the weather forecasts 626B. This is performed to account for the contrail's short- and long-wave effects.

The output from the plume-wake interaction model 803 is thus a set of contrail lifecycle data 1007 for a plurality of possible exhaust compositions, and hence water-fuel ratios.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A method comprising operating an aircraft gas turbine engine, the method comprising:
   providing a source of fuel and a source of water;
   identifying an atmospheric condition, the atmospheric condition being an atmospheric condition causative of a condensation trail;

determining a water-fuel ratio for injection into a combustor of the gas turbine engine in response to the atmospheric condition;

injecting water and fuel according to said water-fuel ratio into the combustor to control soot emissions caused by combustion of the fuel therein.

2. The method of claim 1, in which the determined water-fuel ratio reduces the soot emissions compared to a dry mode of operation.

3. The method of claim 1, in which the water-fuel ratio is determined on the basis of a time-integrated effect of a persistent condensation trail over the lifespan of the persistent condensation trail given a current atmospheric condition and a predicted future atmospheric condition.

4. The method of claim 1, further comprising detecting the atmospheric condition using a direct measurement device.

5. The method of claim 1, further comprising inferring the atmospheric condition.

6. The method of claim 1, in which the water is injected upstream of a primary zone of the combustor.

7. The method of claim 6, in which the fuel is injected by one or more fuel injectors, each one of the one or more fuel injectors has an associated water injector configured to co-inject the water with the fuel.

8. The method of claim 1, wherein the determining step comprises:
identifying the atmospheric condition to the effect that reducing an optical depth of the condensation trail would reduce a net warming impact of the condensation trail;
evaluating the water-fuel ratio that varies soot production to reduce ice particle formation.

9. The method of claim 1, wherein the determining step comprises:
identifying the atmospheric condition to the effect that increasing an optical depth of the condensation trail would reduce a net warming impact of the condensation trail;
evaluating the water-fuel ratio that varies soot production to increase ice particle formation.

10. A gas turbine engine for an aircraft, comprising:
a combustor;
a fuel injection system connected with a source of fuel and configured to inject fuel into the combustor;
a water injection system connected with a source of water and which is configured to inject water into the combustor;
a control system configured to: identify an atmospheric condition, the atmospheric condition being an atmospheric condition causative of a condensation trail; determine a water-fuel ratio for injection into the combustor of the gas turbine engine in response to the atmospheric condition; and control injection of the fuel and the water by the fuel injection system and the water injection system according to said water-fuel ratio to control soot emissions caused by combustion of the fuel therein.

11. The gas turbine engine of claim 10, in which the control system is configured to determine the water-fuel ratio that reduces the soot emissions compared to a dry mode of operation.

12. The gas turbine engine of claim 10, in which the control system is configured to determine the water-fuel ratio on the basis of a time-integrated effect of a persistent condensation trail over the lifespan of the persistent condensation trail given a current atmospheric condition and a predicted future atmospheric condition.

13. The gas turbine engine of claim 10, further comprising a direct measurement device for detecting the atmospheric condition.

14. The gas turbine engine of claim 10, in which the atmospheric condition is inferred.

15. The gas turbine engine of claim 10, in which the water injection system comprises one or more water injectors located upstream of a primary zone of the combustor.

16. The gas turbine engine of claim 15, in which the fuel injection system comprises one or more fuel injectors, each one of which has an associated water injector configured to co-inject the water with the fuel injected by the fuel injector.

17. The gas turbine engine of claim 10, in which the control system is configured to determine the water-fuel ratio by:
identifying the atmospheric condition to the effect that reducing an optical depth of the condensation trail would reduce a net warming impact of the condensation trail;
evaluating the water-fuel ratio that varies soot production to reduce ice particle formation.

18. The gas turbine engine of claim 10, in which the control system is configured to determine the water-fuel ratio by:
identifying the atmospheric condition to the effect that increasing an optical depth of the condensation trail would reduce a net warming impact of the condensation trail;
evaluating the water-fuel ratio that varies soot production to increase ice particle formation.

* * * * *